(12) United States Patent  
Forster (10) Patent No.: US 7,100,432 B2  
(45) Date of Patent: Sep. 5, 2006

(54) CAPACITIVE PRESSURE SENSOR

(75) Inventor: Ian J. Forster, Chelmsford (GB)

(73) Assignee: Mineral Lassen LLC, Las Vegas, NV (US)

( * ) Notice: Subject to any disclaimer, the term of this patent is extended or adjusted under 35 U.S.C. 154(b) by 243 days.

(21) Appl. No.: 10/164,459

(22) Filed: Jun. 6, 2002

(65) Prior Publication Data

US 2004/0159158 A1   Aug. 19, 2004

(51) Int. Cl.  
*G01M 17/02* (2006.01)

(52) U.S. Cl. .................................................. 73/146

(58) Field of Classification Search ............... 73/146, 73/700, 718, 724, 714, 716  
See application file for complete search history.

(56) References Cited

U.S. PATENT DOCUMENTS

| | | | | |
|---|---|---|---|---|
| 3,199,345 A | * | 8/1965 | Lee et al. ............... | 73/862.623 |
| 3,990,309 A | | 11/1976 | Beckwith et al. | |
| 4,584,625 A | * | 4/1986 | Kellogg .................... | 361/283.1 |
| 4,807,477 A | | 2/1989 | Myers et al. | |
| 4,876,892 A | | 10/1989 | Arabia et al. | |
| 4,944,187 A | * | 7/1990 | Frick et al. ................. | 73/718 |
| 5,050,035 A | | 9/1991 | Hegner et al. | |
| 5,347,280 A | | 9/1994 | Schuermann | |
| 5,699,041 A | * | 12/1997 | Ballyns ....................... | 340/442 |
| 5,959,524 A | | 9/1999 | Wienand et al. | |
| 5,961,215 A | | 10/1999 | Lee et al. | |
| 5,974,893 A | | 11/1999 | Balcarek et al. | |
| 6,272,936 B1 | | 8/2001 | Oreper et al. | |
| 6,299,349 B1 | | 10/2001 | Steinel et al. | |
| 6,483,473 B1 | | 11/2002 | King et al. | |
| 6,501,435 B1 | | 12/2002 | King et al. | |
| 6,630,910 B1 | | 10/2003 | Forster et al. | |
| 6,727,561 B1 | * | 4/2004 | Sato et al. .................. | 257/414 |
| 6,823,728 B1 | * | 11/2004 | Barnes ......................... | 73/146 |
| 6,865,950 B1 | * | 3/2005 | Freakes et al. ............... | 73/702 |
| 2001/0004236 A1 | | 6/2001 | Letkomiller et al. | |
| 2001/0008083 A1 | | 7/2001 | Brown ......................... | 73/146 |
| 2002/0078757 A1 | * | 6/2002 | Hines et al. .................. | 73/727 |
| 2004/0035211 A1 | | 2/2004 | Pinto et al. | |
| 2004/0103724 A1 | * | 6/2004 | Takizawa et al. ............. | 73/754 |

FOREIGN PATENT DOCUMENTS

DE          3023218 A      2/1982

* cited by examiner

*Primary Examiner*—Edward Lefkowitz  
*Assistant Examiner*—Andre Allen  
(74) *Attorney, Agent, or Firm*—Christensen O'Connor Johnson Kindness PLLC (57) ABSTRACT

A capacitive pressure sensor comprises a pair of conductive plates surrounding a compressible dielectric to form a capacitor. Changes in pressure create changes in the capacitance of the capacitor which in turn may be measured to determine the changes in pressure. The pressure sensor may be constructed to be temperature and centripetal force compensated so that it may be positioned in a tire. A further embodiment uses the conductive plates to form a radiating element for the sensor such that it may wirelessly communicate with a remote interrogator.

67 Claims, 9 Drawing Sheets

CAPACITIVE PRESSURE SENSOR

FIELD OF THE INVENTION

The present invention relates to a capacitive pressure sensor, and particularly to a pressure sensor that is positioned in a tire and communicates information relating to the pressure to a remote interrogator.

BACKGROUND OF THE INVENTION

Every iteration of vehicle design results in greater complexity for the vehicle in an effort to improve functionality. Vehicles now monitor many parameters that previously had to be addressed through routine maintenance or expensive diagnostics. This monitoring is done by vehicle controllers. By providing this access to information about the vehicle, expectations about possibilities arise and this creates a demand for more information from which to synthesize still further parameters that may improve performance.

Tire pressure monitoring may be important since the pressure in a tire governs its proper operation and safety in use. For example, too little pressure in a tire during its use can cause a tire to be damaged by the weight of a vehicle supported by the tire. Too much pressure can cause a tire to rupture. Tire pressure is currently tested by hand-held devices when the vehicle is stopped, and thus it is difficult to secure tire pressure information while the vehicle is operational.

In related areas, there has been an increase in the desire to track goods as they move through the manufacturing, distribution and retail processes. To that end, many goods are being equipped with radio frequency identification tags (RFID). Tires are one such good that may benefit from the use of a wireless communication device that communicates information regarding the tire, such as a tire's identification, pressure, temperature, and other environmental information. For example, tire pressure must be tested during the manufacturing process to ensure that the tire meets intended design specifications. The tire pressure should also be within certain pressure limits during use to avoid dangerous conditions. Knowledge of the tire pressure during the operation of a vehicle can be used to inform an operator and/or vehicle system that a tire has a dangerous pressure condition.

Thus, there remains a need for a pressure sensor associated with a tire that can wirelessly communicate to a remote location.

SUMMARY OF THE INVENTION

The present invention provides a pressure sensor that measures pressure based on a force placed on a dielectric material. The pressure sensor may be coupled to a wireless communication device that wirelessly communicates information relating to the pressure sensed to a remote location. In an exemplary embodiment, this pressure sensor may be positioned in a vehicle tire and communicate wirelessly to a vehicle controller such that the vehicle controller is aware of the pressure within the tires.

At its simplest, the present invention comprises a pair of conductive plates sandwiching a resilient, compressible dielectric to form a capacitor. As the pressure around the capacitor changes, the dimensions of the compressible dielectric change, thereby changing the capacitance. This change in capacitance may be used to derive a pressure therefrom. A radio frequency chip may communicate wirelessly to a remote location, conveying information about the pressure exerted on the capacitor.

In a first alternate embodiment, the capacitor's structure is changed to be temperature compensated. A first contemplated structure includes a temperature measuring device that reports a temperature in conjunction with the reported pressure. From these two data points, the vehicle controller may derive a temperature compensated pressure. A second contemplated structure includes an element that changes shape according to known parameters according to temperature. The change in shape may exert a force on the capacitor to provide a known effect on the shape of the capacitor to compensate for temperature effects on the capacitor. Several forms of structures are propounded which address this embodiment.

In a second alternate embodiment, the capacitor's structure is changed to compensate for centripetal force generated by a tire rotating. A first contemplated structure includes orienting the capacitor's conductive plates parallel to the direction of the rotational forces. A second contemplated structure comprises two capacitors secured to a bridge element. One capacitor would expand under rotational forces and the other capacitor would compress. By empirical testing, the ratio of these effects could be correlated to a rotational force offset.

In a third alternate embodiment, the capacitive plates form radiating elements through which the chip may communicate. Contemplated structures include forming a patch antenna with one plate of the capacitor or forming a dipole antenna on one surface of the dielectric with a radio frequency chip positioned on that same surface.

Other embodiments may combine different elements from the first three embodiments, such as a temperature and rotational force compensating pressure sensor, a radiating temperature compensating pressure sensor or the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent information about the present invention to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is, as indicated above, a capacitive pressure sensor that reflects changes in pressure by changes in capacitance. It is specifically contemplated that this device will be used in a tire of a vehicle, although other uses are possible. To assist in comprehension, a review of this context is in order.

Figure 1:
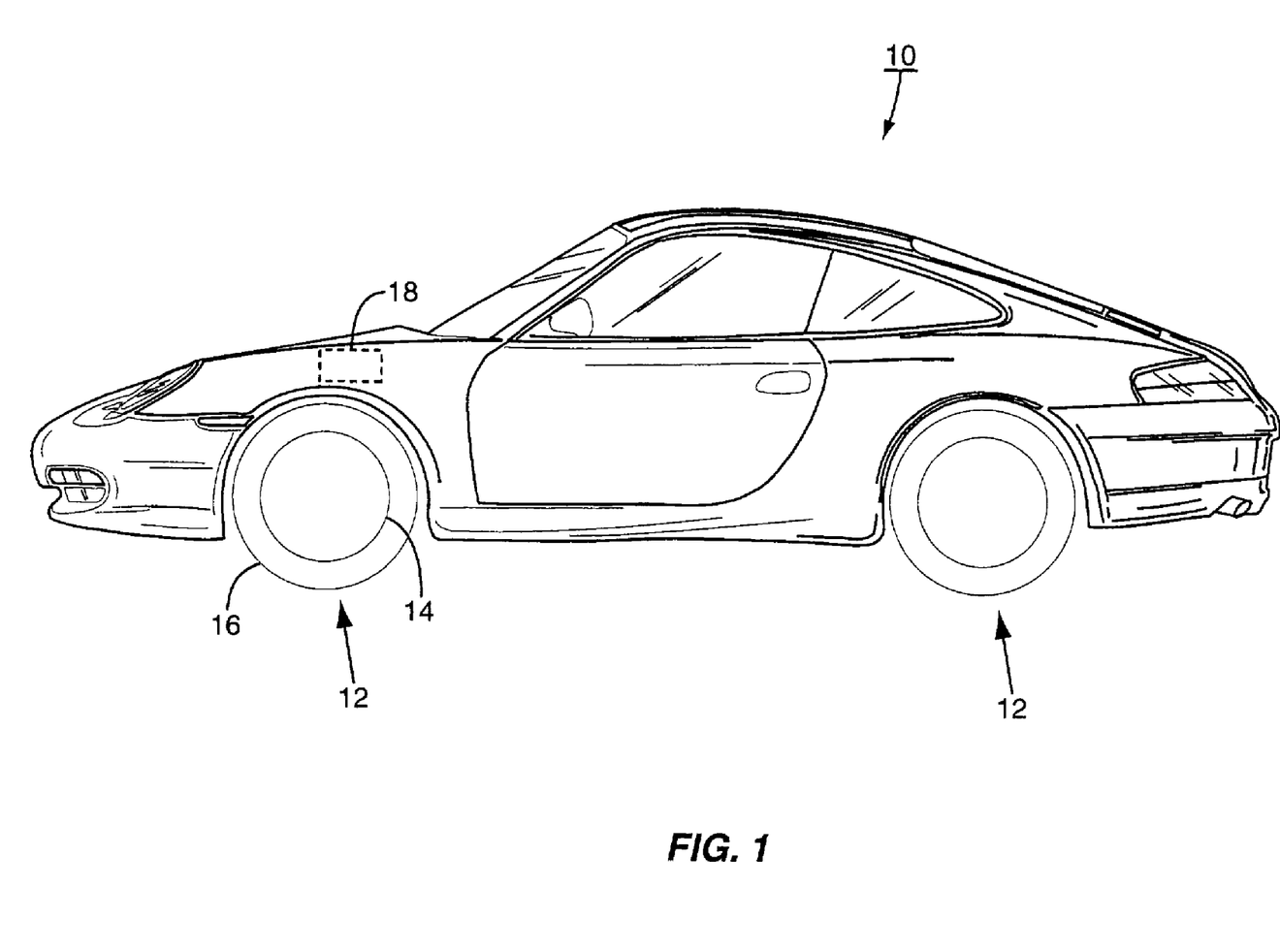
FIG. 1 illustrates a vehicle with wheels mounted thereon.

The present invention is particularly contemplated as being used in a vehicle, such as vehicle 10, illustrated in FIG. 1. More specifically, the present invention may be used in a wheel 12 of the vehicle 10. The wheel 12 comprises a rim 14 and a tire 16 which encircles the rim 14 thereby forming a cavity therebetween, as is well understood. When inflated, the tire 16 has pressurized air therewithin that may fluctuate and affect the performance of the vehicle 10. Further, the wheels 12 rotate when the vehicle 10 is moving creating strong rotational forces. The vehicle 10 may comprise a control system 18 that monitors many parameters about the vehicle 10, including fuel consumption, rate of movement, oil pressure, battery charge level, miles traveled, and the like. Many of these functions are conventional. The present invention adds monitoring pressure within the wheels 12 to the other parameters monitored. Additionally, the present invention may be used during the manufacturing of the tires, and specifically during the pressure testing that is performed during the manufacturing. Armed with information about the tire pressure, vehicle operators may make informed decisions about securing service or the like.

While measuring the pressure in the wheel 12 is a particularly contemplated use of the present invention, other uses of the pressure sensor of the present invention are also contemplated. Further, while the present disclosure explicitly details techniques to compensate for forces present in an operational wheel 12, other force compensating structures appropriate to other environments could be used as well.

Figure 2:
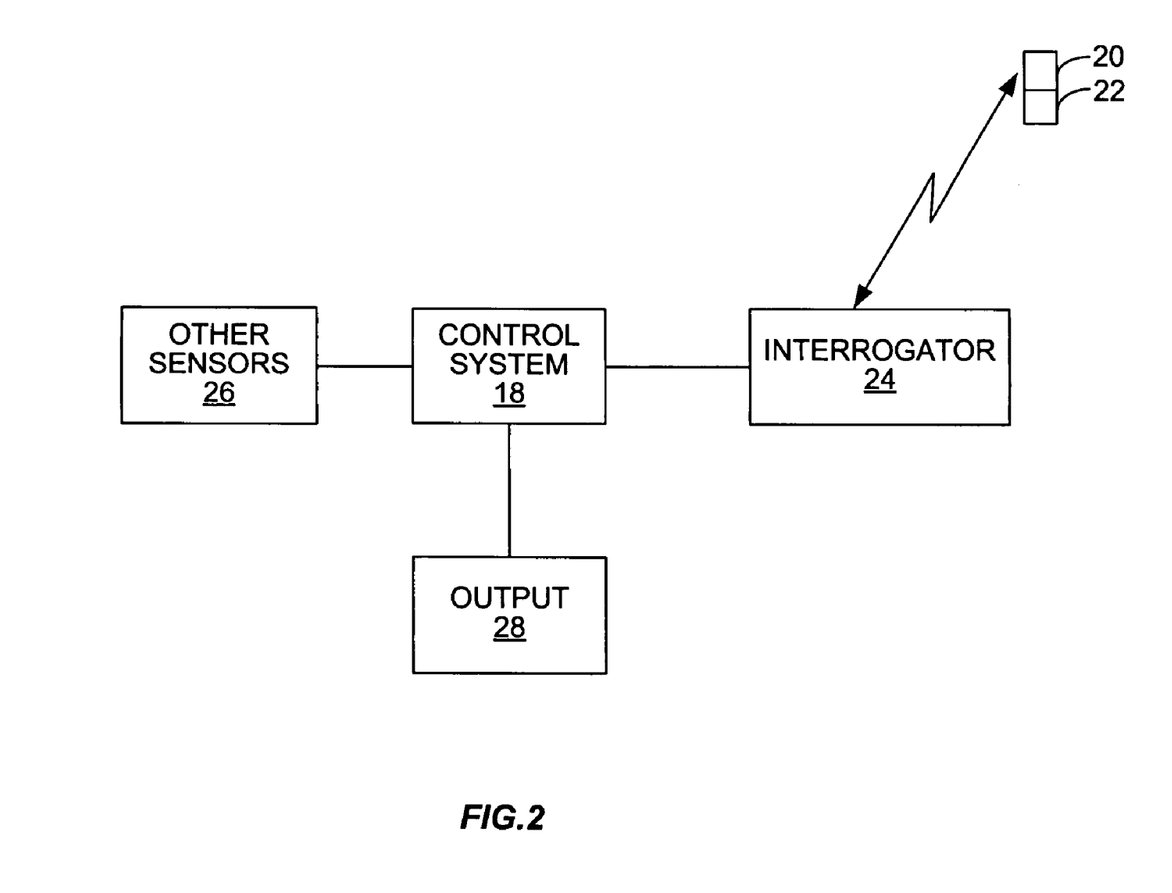
FIG. 2 illustrates a schematic diagram of a control system associated with a vehicle and the control system's communication with sensors about the vehicle.

As illustrated in FIG. 2, the vehicle control system 18 may be connected to a pressure sensor 20 (and optionally a temperature sensor 22) via a wireless communication link, such as through an interrogator 24. The vehicle control system 18 may comprise any type of electronic circuitry including a microprocessor, microcontroller, or the like, associated with supporting circuitry and software. Alternatively, a special purpose integrated circuit or the like could also be used. The vehicle control system 18 may comprise a memory (not shown explicitly) executed program software. Other sensors 26 may also report sensed data to the vehicle control system 18. Such other sensors 26 may comprise vehicle tank monitoring sensors, oil pressure sensors, engine revolution sensors, battery charge sensors, rate of movement sensors, and the like.

The vehicle control system 18 may further be operationally connected to an output 28. The output 28 may take a number of different forms simultaneously. For example, tachometers, speedometers, odometers, and the like all form outputs for the other sensors 26. The output 28 may also comprise a data port (not shown explicitly) to which another computing device is connected and through which data may pass so that the other computing device may run diagnostics or the like on the data so passed. A more detailed exploration of this material may be found in commonly owned U.S. Pat. No. 6,630,910, issued Oct. 7, 2003, which is hereby incorporated by reference in its entirety.

The interrogator 24 may comprise its own internal energy source, such as a battery, or the interrogator 24 may be powered from the vehicle engine or car battery (not shown). The interrogator 24 communicates by emitting a signal modulated by interrogation communication electronics through an interrogation antenna (none shown). The interrogation antenna may be any type of antenna that can radiate a signal through a field so that a reception device can receive such signal through its own antenna. The field may be magnetic, electric, or electromagnetic. The signal may be a message containing information and/or a specific request to perform a task or communicate back information.

Other arrangements for the control system 18 of the vehicle 10 are also possible. The connections between the components may be wire-based or wireless. Other functionalities such as global positioning receivers and the like are also possible. Such other functionalities lie beyond the scope of the present invention and are not germane thereto. Those of ordinary skill in the vehicular art can readily assemble comparable or equivalent systems based on the teachings herein.

Figure 3:
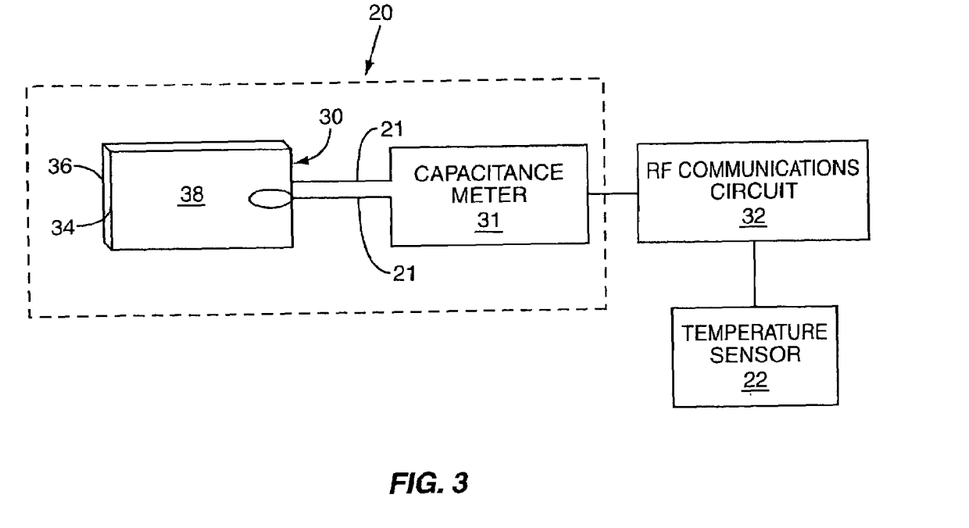
FIG. 3 illustrates a first view of a pressure sensor according to one embodiment of the present invention.
Figure 4:
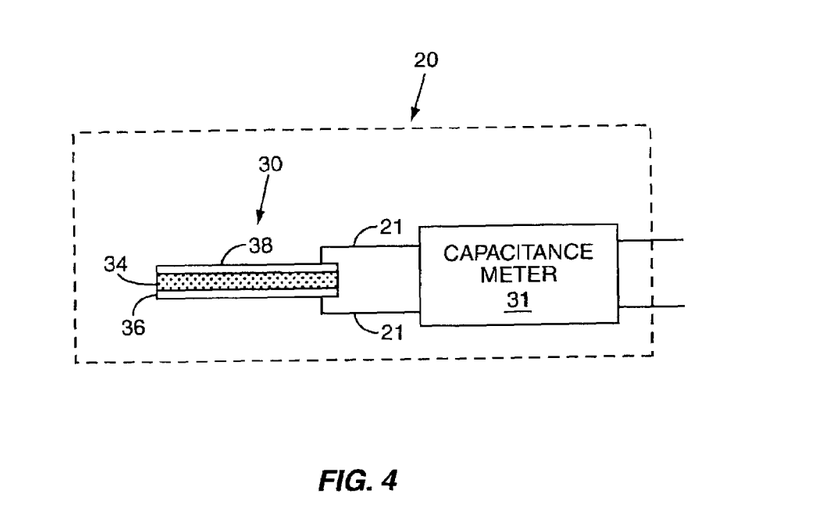
FIG. 4 illustrates a second view of the pressure sensor of FIG. 3.

The pressure sensor 20 is illustrated, in an exemplary embodiment, in FIGS. 3 and 4. FIG. 3 is a combination of illustration and schematic diagram in that the pressure sensor 20 is shown partially in a front perspective view for a capacitor 30 and a block format for capacitance meter 31. The pressure sensor 20 may further comprise connection leads 21 connecting the capacitor 30 to the capacitance meter 31, and thence to an RF communication circuit 32. When a force is placed on the pressure sensor 20, the capacitor 30 has its shape altered, thereby altering the capacitance thereof. The capacitance of the capacitor 30 may be correlated to pressure as described in greater detail below.

The capacitor 30 comprises a resilient, compressible dielectric 34, such as a foam material. Appropriate materials include, but are not limited to: silicone foam material, rubber material, synthetic rubber material, neoprene, polyurethane foam, and Polytetrafluoroethylene (PTFE) foam. The requirements for the dielectric 34 are that it be resilient, generally non-conductive, and not lose its elasticity after repeated compressions and expansions. In a more preferred embodiment, the dielectric 34 comprises a plurality of air pockets therein, such as in a silicone foam material. Positioned contiguously on either side of the dielectric 34, and sandwiching the dielectric 34 therebetween are conductive layers 36 and 38. Contiguous, as used herein, means being proximate to or in actual contact. Sandwich, as used herein, means to insert or enclose between at least two things of another quality or character. An adhesive (not shown) may be used to keep the conductive layers 36, 38 in close contact with the compressible dielectric 34 as would be well understood. Conductive layers 36, 38 may be comprised of metalized polymers, conductive inks printed on the surface of the dielectric 34, metallic foils or the like. The arrangement of two conductive layers 36, 38 sandwiching the dielectric 34 therebetween forms the capacitor 30. As pressure changes around the capacitor 30, the dielectric 34 compresses and expands, thereby changing the capacitance of the capacitor 30. The capacitance is measured by the capacitance meter 31. This change in capacitance is a function of the pressure, and with suitable empirical tests, can be used to provide an indication of the pressure affecting the pressure sensor 20. An exemplary capacitance meter 31 comprises the Wavtek HD115B.

In an exemplary embodiment, the conductive layers 36, 38 are copper and approximately 20 mm×10 mm. The dielectric 34 comprises a 1.5 mm thick silicone foam rubber. Preliminary testing of such a device indicates that capacitance is a linear or near-linear function of pressure and thus pressure is easily derived from the measurements of the capacitance meter 31. Capacitance meter 31 may have approximately 6 pF of capacitance at its input, which may be deducted from its measurements when determining pressure. Additionally, the capacitance meter 31 may be integrated into the RF communication circuit 32.

The RF communication circuit 32 may comprise a control system, communication electronics, memory, and an antenna for receiving and transmitting modulated radio-frequency signals. Various embodiments will use some of these components in conjunction with the pressure sensor 20 and thus a detailed analysis of what component serves what function will be presented below. The following overview discusses a generic arrangement such as may be further developed by those skilled in the art. The control system may be any type of circuitry or processor that receives and processes information received by the communication electronics, including a microprocessor or microcontroller. The memory may store information relating to the pressure measurements from the pressure sensor 20. The memory may be electronic memory, such as random access memory (RAM), read-only memory (ROM), flash memory, diode, etc. or the memory could be mechanical such as a switch or dipswitch. Exemplary RF communications circuits may be found in U.S. Pat. No. 5,347,280, which is hereby incorporated by reference in its entirety.

Temperature sensor 22 may be contained within the RF communication circuit 32 or external thereto as needed or desired. Exemplary temperature sensors 22 may comprise anemometer, semiconductor devices, a chemical device, thermistors or those disclosed in U.S. Pat. Nos. 6,299,349; 6,272,936; 5,959,524, and 5,961,215, all of which are hereby incorporated by reference in their entirety. Note that the temperature sensor 22 is an optional feature and may be omitted.

It is possible to integrate the capacitance meter 31, the temperature sensor 22, an the RF communication circuit 32 into a single device or chip. Alternatively, these elements may remain discrete components if needed or desired.

As a further option, which is not central to the present invention, the RF communication circuit may further comprise an RFID chip. Reference is made to the previously incorporated '206 application for a more lengthy discussion of how such a chip works.

Alternate Embodiments

In the embodiment of FIGS. 3 and 4, if the capacitor 30 is positioned on a planar substrate (such as a printed circuit board) with first conductive layer 36 on the substrate, it is necessary to make a connection to the second conductive layer 38, and this connection must accommodate the changing position of the second conductive layer 38 as pressure changes. This adds complexity to the manufacturing process.

Figure 5:
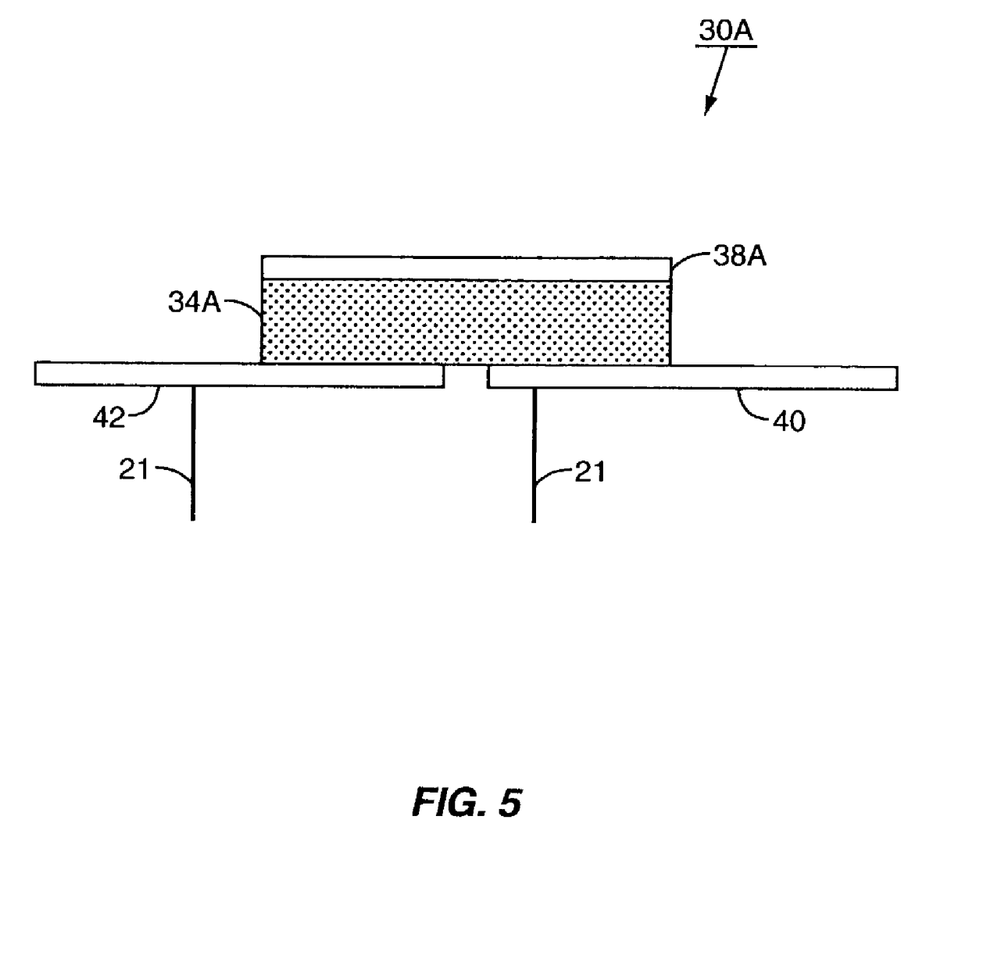
FIG. 5 illustrates a second embodiment of a pressure sensor of the present invention.

FIG. 5 presents one technique by which this difficulty may be addressed. Specifically, a capacitor 30A comprises a compressible dielectric 34A. The first conductive layer comprises two conductive co-planar plates 40, 42. In this arrangement, the dielectric 34A and the second conductive layer 38A form a bridge over two contacts (plates 40, 42) so that no contact between the capacitive meter 31 and the second conductive layer 38A is needed. Instead, the capacitive meter 31 provides connection leads 21 to plates 40, 42. The capacitor 30A behaves as two parallel plate capacitors in series. The measured capacitance will change as a function of pressure as previously described and pressure can be derived from the measured capacitance.

Figure 6:
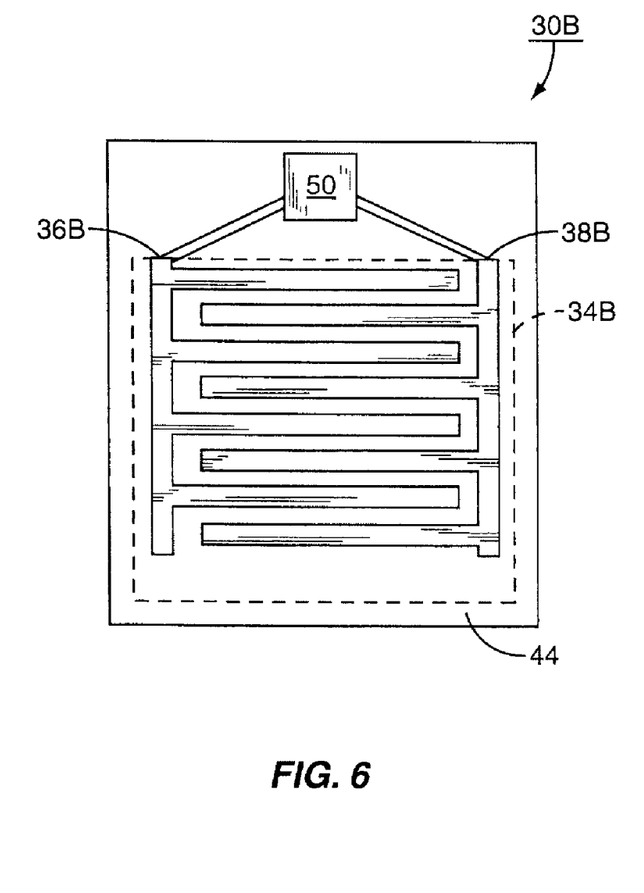
FIG. 6 illustrates a top plan view of a third embodiment of a pressure sensor of the present invention.
Figure 7:
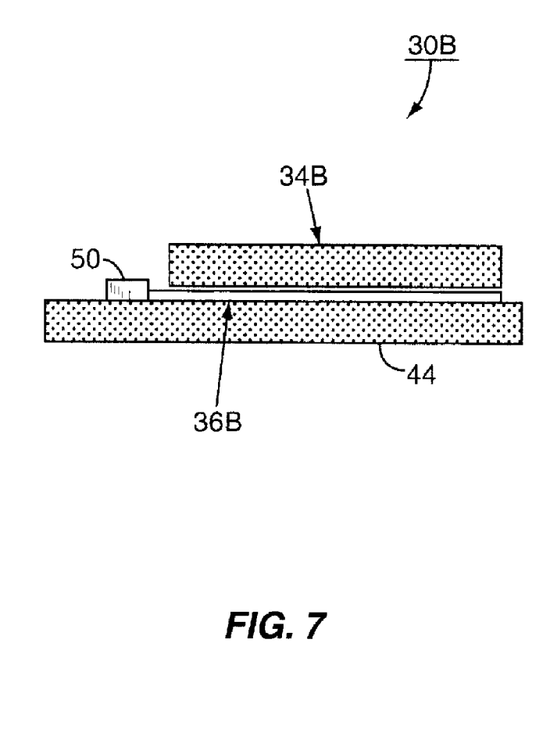
FIG. 7 illustrates a side elevational view of the embodiment of FIG. 6.

FIGS. 6 and 7 illustrate a third embodiment of the present invention, namely one with an interdigital structure. Capacitor 30B comprises a substrate 44 and a compressible dielectric 34B. The substrate 44 may be a printed circuit board or other generally non-conductive material. The first conductive layer 36B and the second conductive layer 38B are formed as interdigital fingers and are connected directly to a sensor chip 50. The compressible dielectric 34B is positioned on top of the first and second conductive layers 36B, 38B, sandwiching the conductive layers between the compressible dielectric 34B and the substrate 44. The sensor chip 50 may include the capacitance meter 31, the RF communication circuit 32 and the like as needed or desired. The capacitance that is measured is a function of the net dielectric constant seen by the interdigital fingers 36B, 38B. The electric field is partially in the compressible dielectric 34B and partially in the substrate 44. As the compressible dielectric 34B expands as a result of decreased pressure, the average dielectric changes, resulting in a change in measured capacitance. Likewise, as the compressible dielectric 34B compresses as a result of increased pressure, the average dielectric changes again, resulting in a change in measured capacitance.

An alternate embodiment of the interdigital structure of FIGS. 6 and 7 comprises using a compressible dielectric over the interdigital fingers and a higher dielectric constant non-compressible material on top of the foam (not shown). As the foam expands and contracts, the higher dielectric material moves relative to the interdigital structures, thus causing a potentially larger change in capacitance than otherwise.

Figure 8:
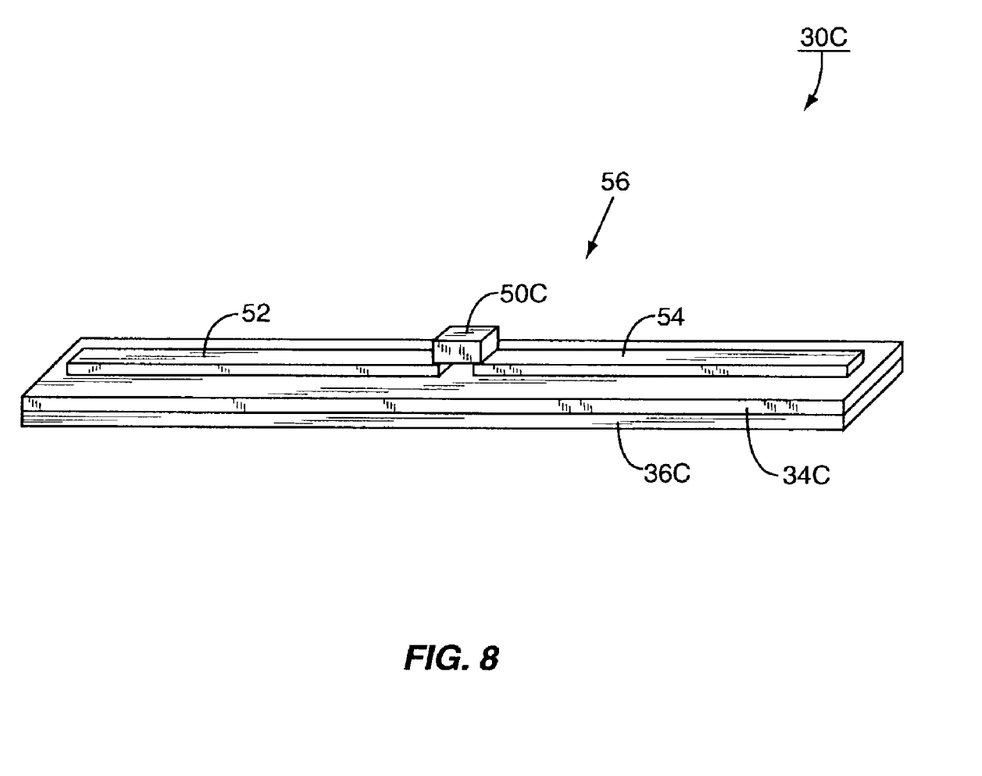
FIG. 8 illustrates a third embodiment of a pressure sensor of the present invention in which an antenna is integrated into the pressure sensor.

FIG. 8 illustrates a fourth embodiment of the capacitor 30C. Capacitor 30C comprises a compressible dielectric 34C, a first conductive layer 36C, a sensor chip 50C, and first and second radiating elements 52, 54, respectively. Radiating elements 52, 54, are positioned on either side of the sensor chip SOC, and are generally co-planar. First conductive layer 36C may function as a ground plane. At comparatively low and DC frequencies, the structure of the capacitor 30C can be considered a capacitor. However, at higher frequencies, the conductive structures associated with radiating elements 52, 54 become a significant fraction of a wavelength, and the areas of conductive material can also act as antenna elements. Specifically, a dipole antenna 56 may be formed by radiating elements 52, 54. For further information about such radiating structures, reference is made to U.S. Pat. No. 6,483,473, issued Nov. 19, 2002, and U.S. Pat. No. 6,501,435, issued Dec. 31, 2002, both of which are hereby incorporated by reference in their entirety. Specifically, these applications deal with symmetric (shown in FIG. 8) and asymmetric antenna structures (not shown).

In use, as the pressure varies around capacitor 30C, the compressible dielectric 34C expands and contracts. There are effectively two parallel plate capacitors in series connected to the sensor chip 50C, formed by the radiating elements 52, 54 and the first conductive layer 36C. Sensor chip 50C may include the capacitance meter 31 and measure the capacitance. The change in the compressible dielectric 34C may change the tuning of the antenna 56 so formed at high frequencies. However, with good antenna design, this can be managed.

Other antenna structures are also contemplated, including a half wave patch antenna, a monopole antenna, a loop antenna or the like.

Figure 9:
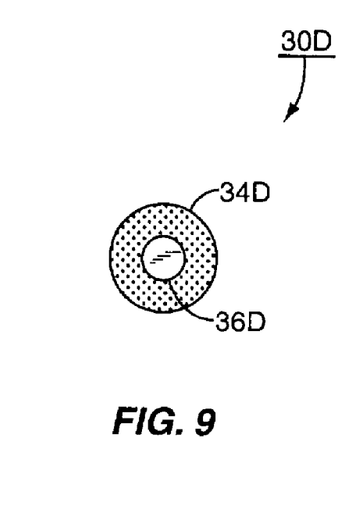
FIG. 9 illustrates a top plan view of a fourth embodiment of the pressure sensor of the present invention.
Figure 10:
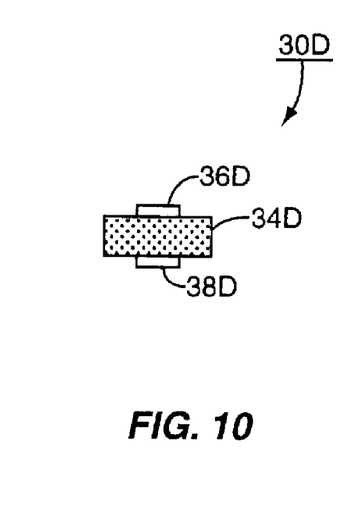
FIG. 10 illustrates a side elevational view of the embodiment of FIG. 9.

One of the reasons that a foam material is preferred for the compressible dielectric is that foam has bubbles of air trapped therewithin that change size with changes in pressure. While air is particularly contemplated, other gases or mixtures of gases may also be trapped within the material. Changing the dimensions or characteristics of the compressible dielectric changes how it responds to the pressure and may provide assistance in achieving linearity of the function between pressure and capacitance. For example, FIGS. 9 and 10 illustrate an alternate shape for the compressible dielectric 34D in the capacitor 30D. Specifically, the compressible dielectric 34D may be formed more like a puck rather than the rectilinear shapes previously illustrated. Also, while alluded to elsewhere in the specification, it is also possible to have conductive layers 36D, 38D that are sized differently from the compressible dielectric 34D.

Figure 11:
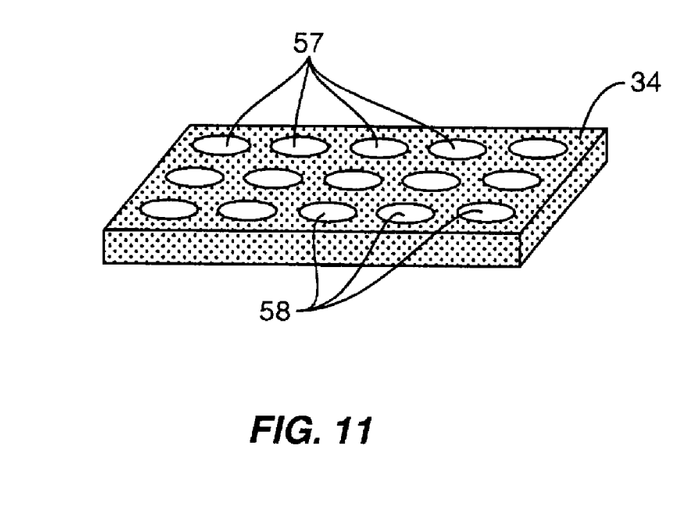
FIG. 11 illustrates a permutation on the compressible dielectric used with the present invention.

FIG. 11 illustrates another technique by which the shape of the compressible dielectric 34 may be manipulated. Specifically, compressible dielectric 34 delimits one or more apertures 57 and/or depressions 58. Either of these delimited structures exposes more area to external pressure, changes the mechanical properties of the compressible dielectric 34, and thus helps customize the compressible dielectric 34 to the needs of the designer. Note that while the apertures 57 and depressions 58 are illustrated as cylindrical voids, other shapes are possible if needed or desired by the designer. One advantage of these structures comes when the dielectric 34 with the apertures 57 is sandwiched between two conductive layers 36, 38 that also have apertures (not shown). If the conductive layers 36, 38 are constructed so that they do not move with pressure (making it easier to connect them to sensor chip 50) there is still a change in capacitance as the walls of the apertures 57 will bulge inwards and outwards depending on the applied pressure. This changes the average density of the dielectric 34, thereby changing the dielectric constant and changing the capacitance thereby. When the dielectric 34 of FIG. 11 is used with movable conductive layers 36, 38, greater response to pressure may be achieved.

As should be appreciated, the differently sized and configured dielectrics 34 may be used with different capacitors 30. Thus, a puck-shaped dielectric 34 could be used with antenna 56, the two capacitor arrangement of FIG. 5 or the like as needed or desired.

As would be expected, if the pressure sensor 20 is mounted in a wheel 12 of a vehicle 10, the pressure sensor 20 is exposed to high levels of rotational force as the wheel 12 turns during the driving of the vehicle 10. This rotational force will distort the shape of the compressible dielectric 34.

Before discussing this further, a few definitions are in order. "Centripetal force," as used herein, means the force that is necessary to keep an object moving in a circular path and that is directed inward toward the center of rotation. "Centrifugal force," as used herein, means 1) the force that tends to impel a thing or parts of a thing outward from a center of rotation, and 2) the force that an object moving along a circular path exerts on the body constraining the object and that acts outwardly away from the center of rotation. Both centripetal and centrifugal forces are defined herein as "rotational forces."

In a first technique to address these rotational forces, the vehicle controller 18 may compensate for rotational forces with software. The vehicle controller 18 may pull information from the other sensor 26 to determine the vehicle speed, and from this, derive a rotational speed of the wheel 12. A look-up table, formula, or algorithm stored in memory or the like may be used with the rotational speed information, cross-referenced with the reported capacitance sensed to derive or calculate the compensated pressure.

Figure 12:
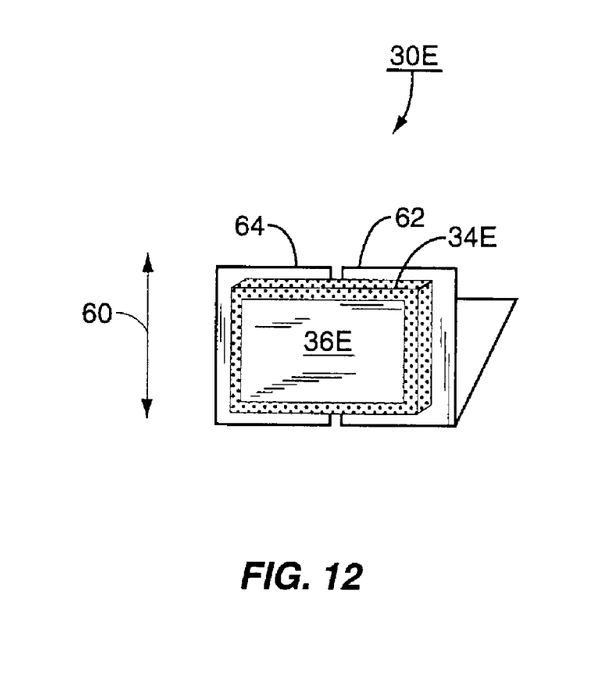
FIG. 12 illustrates a fifth embodiment of the pressure sensor of the present invention that compensates for rotational forces.

Alternatively, the pressure sensor 20 may be modified in structure to compensate for the rotational forces. FIG. 12 illustrates one such compensation scheme wherein capacitor 30E is mounted parallel to the rotational force axis 60 and perpendicular to the rim 14 (not shown in FIG. 12). Capacitor 30E comprises a compressible dielectric 34E, with a first conductive layer 36E and a second conductive layer formed by two L-shaped conductive members 62, 64. L-shaped conductive members 62, 64 function as connection leads 21 in this embodiment. In this manner, as the rotational acceleration increases, it will apply a shearing force on the dielectric 34E. However, if the dielectric is relatively thin, and the first conductive layer 36E of a low mass, the change in overall capacitance will be small in comparison to the changes in capacitance due to pressure changes.

Figure 13:
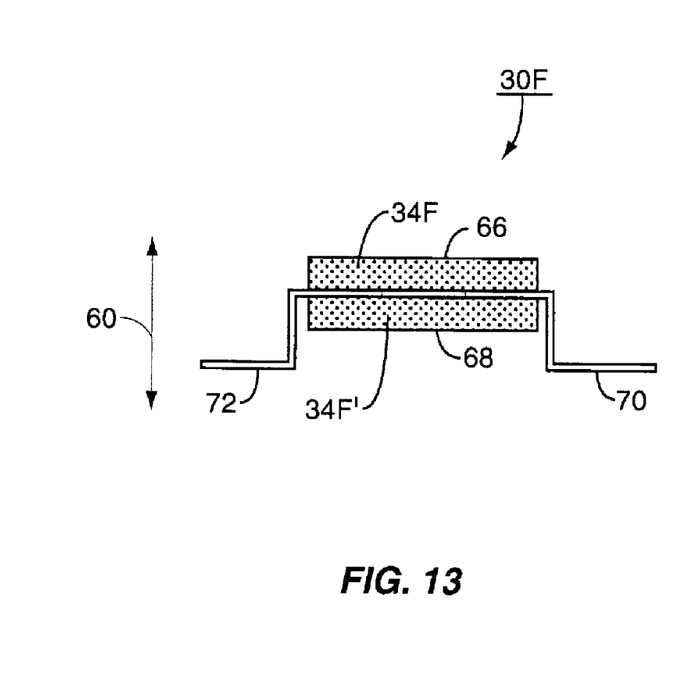
FIG. 13 illustrates a sixth embodiment of the pressure sensor of the present invention that compensates for rotational forces.

A second rotational force compensation scheme is illustrated in FIG. 13, wherein a capacitor 30F comprises a first compressible dielectric 34F, a second compressible dielectric 34F', a first conductive layer 66 and a second conductive layer 68, each positioned contiguous their respective dielectric layers 34, and leads 70, 72. Leads 70, 72 are generally S-shaped, conductive, and substantially rigid. This structure creates two double series capacitors in effect. When an acceleration force 60 is applied, the dielectric 34F is compressed (increasing the capacitance for those two capacitors), and the dielectric 34F' expands as it is stretched (decreasing the capacitance for those two capacitors). This can result in a net zero change in capacitance due to rotational forces, effectively compensating for the rotational forces. As might be expected, this structure too could be mounted parallel to the rotational forces like the embodiment of FIG. 12.

In another embodiment, two sensors 20 may be used. One sensor 20 may be more susceptible to rotational forces than the other. As rotational force increases, the difference between the two sensors may be used to determine the rotational force exerted, and from that determine a compensation scheme to apply to the capacitance sensed by the capacitance meter 31.

Still other rotational force compensators are contemplated, such as a coaxial tube, or any other pair of shapes which helps negate or minimize rotational force affects on the capacitors.

In the event that it is considered undesirable to include a specific temperature measuring element 22, it is possible to compensate for temperature effects through an appropriate structure. In a first technique, ceramic elements with dielectric constants that change with temperature are known. Specifically, some materials have dielectric constants that increase as temperature increases, and some materials have dielectric constants that decrease as temperature increases. These can either be included as a layer in the compressible dielectric 34, compensating the overall capacitance, or as a separate capacitor placed in parallel with the capacitor 30 so that the total capacitance stays constant.

Figure 14:
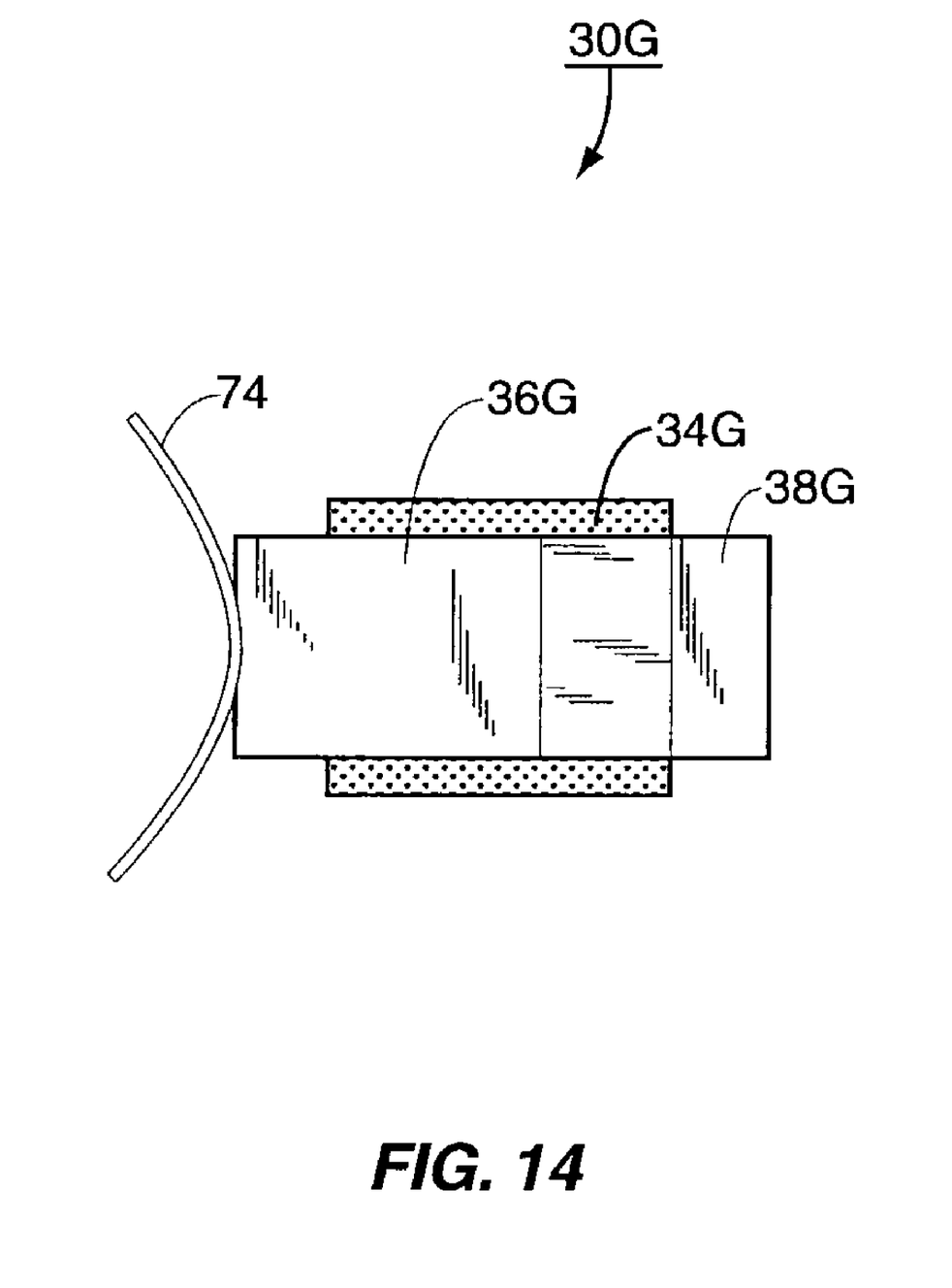
FIG. 14 illustrates a seventh embodiment of the pressure sensor of the present invention that compensates for temperature fluctuations.

In a second technique of temperature compensation, layered plastics and/or metals can make structures that provide a relatively large degree of mechanical movement with temperature. As illustrated in FIG. 14, such movement may be used to move the parallel plates of a capacitor. Specifically, capacitor 30G comprises a compressible dielectric 34G, a first conductive layer 36G, a second conductive layer 38G, and a temperature compensating member 74. As the temperature changes, member 74 bends according to its mechanical properties, which moves first conductive layer 36G on compressible dielectric 34G such that either more or less overlappage be existent between first and second conductive layers 36G, 38G.

Alternatively, first and second conductive layers 36G, 38G may be formed of temperature-induced shape changing conductive materials such that the conductive layers 36G, 38G move of their own accord in the presence of temperature changes providing the desired compensation for temperature changes.

In still another embodiment, similar to that shown in FIG. 13, first dielectric layer 34F could have a temperature coefficient in one direction and second dielectric layer 34F' could have a temperature coefficient in the other direction. Thus, as temperature increases, one dielectric layer 34F or 34F' would contract (increasing capacitance) and the other dielectric layer 34F or 34F' would expand (decreasing capacitance). Through measurements, these could offset one another such that only the effect due to pressure was being measured by the capacitance meter 31. Other arrangements of capacitors in parallel with similarly opposite temperature compensating dielectrics 34 may also be used.

In another embodiment (not shown explicitly), the sensor chip 50 is positioned next to the dielectric 34, and bond pads are used as both the conductive layers 36, 38 as well as connection leads 21. Given the small size of this structure, if more capacitance is required, the dielectric 34 may be doped with a ceramic element. This ceramic element could also provide temperature compensation as described above. For example, Barium Titanate (BaTiO3), which has a dielectric constant (Er) of 38.6 in its pure state, can be modified to have both positive and negative temperature coefficient of dielectric constant (Tc, usually expressed in part per million, ppm) by the inclusion of other metal oxides, such as zinc and strontium. Er is another symbol for the dielectric constant and Tc is another symbol for temperature coefficient of the dielectric constant in parts per million.

Loading the dielectric 34 with a ceramic material could be done in any of the embodiments illustrated, and may be done to make the capacitance and the capacitance change larger. This may reduce measurement errors.

Those skilled in the art will recognize improvements and modifications to the preferred embodiments of the present invention. All such improvements and modifications are considered within the scope of the concepts disclosed herein and the claims that follow.

What is claimed is:

1. A wheel, comprising:
   a rim;
   a tire surrounding said rim and sealing a gas under pressure within a cavity formed by said tire and said rim; and
   a pressure sensor in said tire, wherein the pressure sensor is configured to sense the pressure of the gas within the cavity, said pressure sensor comprising:
      a first conductive layer;
      a compressible dielectric contiguous to said first conductive layer; and
      a second conductive layer contiguous to said compressible dielectric, wherein said first and second conductive layers form a capacitor;
      wherein said capacitor is adapted to reflect a capacitance in relation to pressure changes within the cavity; and
      wherein said pressure sensor further comprises a temperature compensating element associated with said capacitor.

2. The wheel of claim 1, wherein said pressure sensor is mounted on said rim.

3. The wheel of claim 2 further comprising a remote communication device associated with said capacitor, wherein said remote communication device is configured to communicate pressure information to a remote location.

4. The wheel of claim 3, wherein said remote communication device is co-planar with said first conductive layer.

5. The wheel of claim 3, wherein said first conductive layer comprises two radiating elements operative to radiate as an antenna for said remote communication device.

6. The wheel of claim 3, wherein said remote communication device is adapted to respond to an interrogation from the remote location.

7. The wheel of claim 2, wherein said pressure sensor further comprises a rotational force compensator.

8. The wheel of claim 7, wherein said rotational force compensator comprises a bend in said first conductive layer such that said capacitor is mounted to said rim substantially perpendicular to a radius associated with the tire.

9. The wheel of claim 8, wherein said first conductive layer comprises two co-planar L-shaped pieces of metal, said L-shape containing said bend.

10. The wheel of claim 8, wherein said second conductive layer comprises a low mass when compared to a mass associated with said first conductive layer.

11. The wheel of claim 7, wherein said rotational force compensator comprises:
   a second compressible material, both said compressible material and said second compressible material positioned between said first and second conductive layers; and
   a pair of generally S-shaped conductors, at least a portion of each S-shaped conductor positioned between said second compressible material and said compressible material.

12. The wheel of claim 1, wherein said temperature compensating element comprises a ceramic element.

13. The wheel of claim 12, wherein said ceramic element is disposed within said compressible dielectric.

14. The wheel of claim 12, wherein said ceramic element comprises a second dielectric sandwiched between a third and fourth conductive layer, forming a second capacitor in parallel with said capacitor.

15. The wheel of claim 1, wherein said temperature compensating element comprises a layered plastic and metal structure.

16. The wheel of claim 1 further comprising a temperature sensor associated with said pressure sensor.

17. The wheel of claim 1, wherein the pressure sensor is positioned in the cavity to sense the pressure of the gas within the cavity.

18. The wheel of claim 1, wherein the pressure sensor is associated with said rim for measuring the pressure of the gas within the cavity.

19. A pressure sensing system, comprising:
a vehicle, comprising:
a control system; and
a wheel, comprising:
a rim;
a tire surrounding said rim and sealing a gas under pressure within a cavity formed by said tire and said rim;
a pressure sensor in said tire, wherein the pressure sensor is configured to sense pressure within said tire, said pressure sensor including a first conductive layer; a compressible dielectric contiguous to said first conductive layer; and a second conductive layer contiguous to said compressible dielectric, wherein said first and second conductive layers form said capacitor, said capacitor having a capacitance that varies according to pressure changes within the cavity and further includes a temperature compensation element; and
a remote communication device associated with said pressure sensor, wherein said remote communication device is configured to communicate information from said pressure sensor to a remote location.

20. The pressure sensing system of claim 19, wherein said pressure sensor comprises a rotational force compensator.

21. The pressure sensing system of claim 19, wherein said first conductive layer comprises radiating elements for said remote communication device.

22. The pressure sensing system of claim 21, wherein said remote communication device is generally co-planar with said radiating elements.

23. The pressure sensing system of claim 19, wherein said vehicle further comprises an interrogator operatively connected to said control system and said remote communication device is configured to communicate with said interrogator.

24. The pressure sensing system of claim 19, wherein said first and second conductive layers sandwich said compressible dielectric therebetween.

25. The pressure sensing system of claim 19 further comprising a temperature sensor associated with said pressure sensor and said remote communication device.

26. The pressure sensing system of claim 19 further comprising a rotational force compensator associated with said pressure sensor.

27. The pressure sensing system of claim 19, wherein the pressure sensor is positioned on said rim for sensing the pressure of the gas within the cavity.

28. The pressure sensing system of claim 19, wherein the pressure sensor is associated with said cavity to measure the pressure of the gas within the cavity.

29. A method of sensing pressure of a gas in a cavity, comprising:
forming a capacitor in the cavity from a compressible dielectric material and a pair of conductive layers;
measuring capacitance associated with the capacitor, wherein changes in capacitance are related to changes in pressure as a function of the compressible dielectric; and
compensating for temperature changes.

30. The method of claim 29 further comprising communicating information about the changes in capacitance to a remote location through a remote communication device.

31. The method of claim 30, wherein communicating information to a remote location comprises using at least one of the pair of conductive layers as a radiating element for the remote communication device.

32. The method of claim 29 further comprising compensating for rotational forces.

33. The method of claim 32, wherein compensating for rotational forces comprises mounting the capacitor parallel to a direction associated with the rotational forces.

34. The method of claim 32, wherein compensating for rotational forces comprises providing a second capacitor associated with the capacitor, said capacitor experiencing compression during rotational force application and said second capacitor experiencing expansion during rotational force application.

35. The method of claim 29, wherein compensating for temperature changes comprises measuring a temperature proximate the capacitor.

36. The method of claim 29, wherein compensating for temperature changes comprises providing structure associated with the capacitor that changes the capacitance in a predictable fashion as a function of temperature.

37. The method of claim 36, wherein providing structure comprises associating an element whose shape changes as a function of temperature.

38. The method of claim 36, wherein providing structure comprises inserting a dielectric whose dielectric constant changes as a function of temperature.

39. The method of claim 29, wherein forming a capacitor comprises sandwiching the compressible dielectric between the pair of conductive layers.

40. A method of sensing pressure in a tire, comprising:
forming a pressure sensor from a compressible material and a pair of conductive layers;
associating a remote communication device with the pressure sensor;
placing the pressure sensor in a tire;
determining pressure changes by changes in the compressible material which affect the capacitance of the pressure sensor;
compensating for temperature changes within the tire; and
interrogating the remote communication device to convey information about pressure changes in the tire.

41. The method of claim 40 further comprising measuring the temperature within the tire.

42. The method of claim 40 further comprising compensating for rotational forces as the tire rotates.

43. The method of claim 40 further comprising using at least one of the conductive layers as a radiating element for the remote communication device.

44. The method of claim 40 further comprising mounting the pressure sensor on a rim associated with the tire.

45. A wheel, comprising:
a rim;
a tire surrounding said rim and sealing a gas under pressure within a cavity formed by said tire and said rim; and
a pressure sensor configured to sense the pressure of the gas within the cavity, said pressure sensor comprising:

a first conductive layer;
a compressible dielectric contiguous to said first conductive layer; and
a second conductive layer contiguous to said compressible dielectric, wherein said first and second conductive layers form a capacitor;
wherein said capacitor is adapted to reflect a capacitance in relation to pressure changes within the cavity; and
wherein said pressure sensor further comprises a rotational force compensator.

46. The wheel of claim 45, wherein said rotational force compensator comprises a bend in said first conductive layer such that said capacitor is mounted to said rim substantially perpendicular to a radius associated with the tire.

47. The wheel of claim 46, wherein said first conductive layer comprises two co-planar L-shaped pieces of metal, said L-shape containing said bend.

48. The wheel of claim 46, wherein said second conductive layer comprises a low mass when compared to a mass associated with said first conductive layer.

49. The wheel of claim 45, wherein said rotational force compensator comprises:
a second compressible material, both said compressible material and said second compressible material positioned between said first and second conductive layers; and
a pair of generally S-shaped conductors, at least a portion of each S-shaped conductor positioned between said second compressible material and said compressible material.

50. The wheel of claim 45 further comprising a remote communication device associated with said pressure sensor for communicating pressure information to a remote location.

51. The wheel of claim 50, wherein said remote communication device is co-planar with said first conductive layer.

52. The wheel of claim 51, wherein said first conductive layer comprises two radiating elements operative to radiate as an antenna for said remote communication device.

53. The wheel of claim 51, wherein said remote communication device is configured to respond to an interrogation from the remote location.

54. The wheel of claim 45 further comprising a temperature sensor associated with said pressure sensor.

55. The wheel of claim 45, wherein the pressure sensor is positioned in the cavity to sense the pressure of the gas within the cavity.

56. The wheel of claim 45, wherein the pressure sensor is associated with said rim for measuring the pressure of the gas within the cavity.

57. A pressure sensor for sensing pressure of a gas in a cavity, comprising:
a first conductive layer;
a second conductive layer;
a compressible dielectric material disposed between the first and second conductive layers to form a capacitor in the cavity having a capacitance, wherein the capacitor is configured to change capacitance in relation to pressure changes on the compressible dielectric and thereby reflect pressure information; and
a temperature compensating element configured to compensate the pressure information for temperature changes.

58. The pressure sensor of claim 57 further comprising a remote communication device configured to communicate information about the changes in capacitance to a remote location.

59. The pressure sensor of claim 58, wherein said remote communication device is configured to communicate information to a remote location using at least one of said first and second conductive layers as a radiating element.

60. The pressure sensor of claim 57, wherein said temperature compensating element is configured to measure a temperature proximate the capacitor.

61. The pressure sensor of claim 57, wherein said temperature compensating element includes a structure associated with the capacitor that changes the capacitance in a predictable fashion as a function of temperature.

62. The pressure sensor of claim 61, wherein said structure comprises an element whose shape changes as a function of temperature.

63. The pressure sensor of claim 61, wherein said structure comprises a dielectric whose dielectric constant changes as a function of temperature.

64. The pressure sensor of claim 57, wherein said compressible dielectric is sandwiched between said first and second conductive layers.

65. The pressure sensor of claim 57 further comprising a rotational force compensator configured to compensate the pressure information for rotational forces.

66. The pressure sensor of claim 65, wherein said first and second conductive layers and said compressible dielectric forms a first capacitor, and wherein said rotational force compensator is a second capacitor associated with said first capacitor, said first capacitor experiencing compression during rotational force application and said second capacitor experiencing expansion during rotational force application.

67. The pressure sensor of claim 57, wherein said capacitor is mounted parallel to a direction associated with rotational forces to compensate for rotational forces.

* * * * *

UNITED STATES PATENT AND TRADEMARK OFFICE
CERTIFICATE OF CORRECTION

PATENT NO. : 7,100,432 B2  Page 1 of 1
APPLICATION NO. : 10/164459
DATED : September 5, 2006
INVENTOR(S) : Ian J. Forster It is certified that error appears in the above-identified patent and that said Letters Patent is hereby corrected as shown below:

| COLUMN | LINE | ERROR |
|---|---|---|
| 5 | 60 | "an the" should read --and the-- |
| 6 | 60 | "SOC," should read --50C,-- |
| 8 | 53 | "like the" should read --like that of the-- |
| 9 | 23 | "overlappage be" should read --overlappage is-- |
| 14 (Claim 66, line 3) | 43 | "forms a first" should read --form a first-- |

Signed and Sealed this

Thirtieth Day of June, 2009

JOHN DOLL
*Acting Director of the United States Patent and Trademark Office*